United States Patent
Wang et al.

(10) Patent No.: US 11,086,779 B2
(45) Date of Patent: Aug. 10, 2021

(54) SYSTEM AND METHOD OF A HIGHLY CONCURRENT CACHE REPLACEMENT ALGORITHM

(71) Applicant: VMware, Inc., Palo Alto, CA (US)

(72) Inventors: Wenguang Wang, Santa Clara, CA (US); Mounesh Badiger, Bengaluru (IN); Abhay Kumar Jain, Cupertino, CA (US); Junlong Gao, Mountain View, CA (US); Zhaohui Guo, Shanghai (CN); Richard P. Spillane, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 112 days.

(21) Appl. No.: 16/679,570

(22) Filed: Nov. 11, 2019

(65) Prior Publication Data

US 2021/0141728 A1    May 13, 2021

(51) Int. Cl.
*G06F 12/08*    (2016.01)
*G06F 12/0842*  (2016.01)
*G06F 12/0844*  (2016.01)
*G06F 12/14*    (2006.01)
*G06F 12/1018*  (2016.01)
*G06F 12/0871*  (2016.01)

(52) U.S. Cl.
CPC ...... *G06F 12/0842* (2013.01); *G06F 12/0844* (2013.01); *G06F 12/0871* (2013.01); *G06F 12/1018* (2013.01); *G06F 12/1466* (2013.01)

(58) Field of Classification Search
CPC ............. G06F 12/0844; G06F 12/0842; G06F 12/0871; G06F 12/1466; G06F 12/1018
See application file for complete search history.

(56) References Cited

U.S. PATENT DOCUMENTS

| | | | | |
|---|---|---|---|---|
| 5,832,484 A | * | 11/1998 | Sankaran | G06F 16/2343 |
| 9,846,655 B1 | * | 12/2017 | Zhao | G06F 3/061 |
| 10,176,057 B2 | * | 1/2019 | Parakh | G06F 12/0802 |

(Continued)

OTHER PUBLICATIONS

J. M. Malard and R. D. Stewart, "Distributed Dynamic Hash Tables Using IBM LAPI," SC '02: Proceedings of the 2002 ACM/IEEE Conference on Supercomputing, 2002, pp. 10-10.*

(Continued)

*Primary Examiner* — Pierre Miche Bataille
(74) *Attorney, Agent, or Firm* — Patterson + Sheridan, LLP

(57) ABSTRACT

Disclosed are a method and system for managing multi-threaded concurrent access to a cache data structure. The cache data structure includes a hash table and three queues. The hash table includes a list of elements for each hash bucket with each hash bucket containing a mutex object and elements in each of the queues containing lock objects. Multiple threads can each lock a different hash bucket to have access to the list, and multiple threads can each lock a different element in the queues. The locks permit highly concurrent access to the cache data structure without conflict. Also, atomic operations are used to obtain pointers to elements in the queues so that a thread can safely advance each pointer. Race conditions that are encountered with locking an element in the queues or entering an element into the hash table are detected, and the operation encountering the race condition is retried.

20 Claims, 16 Drawing Sheets

(56) References Cited

U.S. PATENT DOCUMENTS

| | | | |
|---|---|---|---|
| 2007/0198792 A1* | 8/2007 | Dice | G06F 12/0815 |
| | | | 711/163 |
| 2008/0021908 A1* | 1/2008 | Trask | G06F 16/9014 |
| 2016/0110403 A1* | 4/2016 | Lomet | G06F 16/2322 |
| | | | 707/695 |
| 2020/0183842 A1* | 6/2020 | Kahle | G06F 9/52 |

OTHER PUBLICATIONS

E. Goodman, M. N. Lemaster and E. Jimenez, "Scalable hashing for shared memory supercomputers," SC '11: Proceedings of 2011 International Conference for High Performance Computing, Networking, Storage and Analysis, 2011, pp. 1-11.*

W. Tsai, N. Huang and H. Hung, "A Lock-Controlled Session Table Partitioning Scheme with Dynamic Resource Balancing for Multi-Core Architecture," 2011 IEEE International Conference on Communications (ICC), 2011, pp. 1-5.*

\* cited by examiner

SYSTEM AND METHOD OF A HIGHLY CONCURRENT CACHE REPLACEMENT ALGORITHM

RELATED APPLICATIONS

The present application is related to U.S. application Ser. No. 16/256,726, filed on Jan. 28, 2019, which is hereby incorporated by reference in its entirety.

BACKGROUND

A cache replacement algorithm is a critical component in many storage systems. One such replacement algorithm uses three queues, a hot queue, a cold queue, and a ghost queue. The hot queue, which typically stores about three-quarters of the cache data, is a ring buffer that operates with a clock algorithm in which data is entered at a current position of a clock hand. The cold queue, which typically stores about one-quarter of the cache data, and the ghost queue, which stores about half of the blocks recently evicted from the cold queue, are buffers operated according to a first-in, first-out algorithm.

The CPU overhead for the above described three-queue algorithm is low, but as the CPU clock speed stays relatively constant and the number of CPU cores continues to increase, the concurrency of the cache algorithm becomes more important. An algorithm that includes locking the entire cache to handle a cache hit and only releasing the lock to handle a cache miss may not be fast enough for the many threads associated with multiple CPU cores. Even simple sharding may not be fast enough due to the contention and waiting overhead of locking of each shard from different cores.

DETAILED DESCRIPTION

Figure 1A:
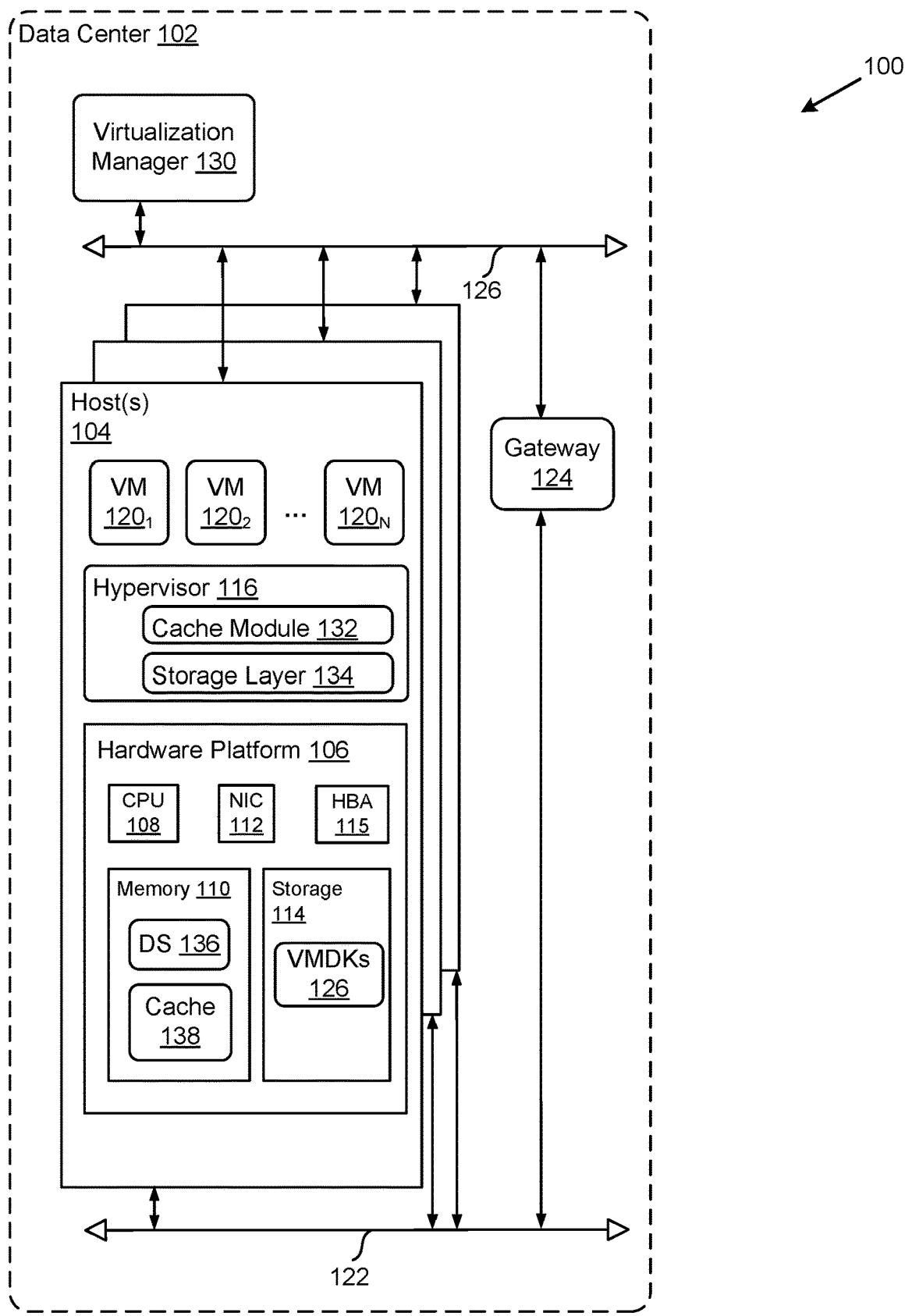
FIG. 1A depicts a block diagram of a computer system in which one or more embodiments of the present disclosure may be utilized.

The present disclosure provides techniques for managing a cache of a computer system using a cache management data structure. The cache management data structure includes three queues, a ghost queue, a cold queue, and a hot queue, that work together to provide the advantages disclosed herein. The techniques of the present disclosure improve the functioning of the computer itself because management of the cache management data structure according to embodiments can be performed in parallel with multiple cores or multiple processors. In addition, a sequential scan will only add unimportant memory pages to the cold queue, and to an extent, to the ghost queue, but not to the hot queue. Also, the cache management data structure according to embodiments has lower memory requirements and lower CPU overhead on cache hit than some of the prior art algorithms that are scan friendly.

In certain embodiments, the cold queue is a queue stored in memory that stores unimportant or less used memory pages than those stored in the hot queue. In certain embodiments, the hot queue is a queue stored in memory that stores important or more frequently used memory pages than those in the cold queue. In certain embodiments, the ghost queue is a queue stored in memory that stores memory pages evicted from the cold queue.

The three-queue cache system includes a fine-grained locking model to make the cache system highly concurrent. A lock is added in each cache element. A lock is added to each hash bucket associated with a hash list, and an atomic variable is used to manage the hot queue pointer (clock hand), cold queue pointer, and ghost queue pointer. A lock order is enforced by always locking a cache entry before locking the hash bucket. The fine-grained locking model avoids any deadlock because, at any time, a thread locks at most one cache element and one hash bucket. In addition, the use of the atomic variables to obtain the queue pointers, allows multiple threads to search the cache for allocation candidates concurrently in a lockless manner.

One embodiment is a method of managing concurrent access by a plurality of threads to a cache data structure. The plurality of threads includes a first thread and a second thread and the cache data structure includes a hash table and at least two queues. The method includes receiving from the first thread a request to allocate an entry from the cache data structure for use in an I/O operation, where the request includes a first key that provides location information for the entry, and the entry includes a second key and a pointer to a location containing cache data. The method further includes (a) accessing the hash table using the first key to determine whether the entry is in the cache data structure by obtaining a first lock on a hash bucket in the hash table to search for the entry, and releasing the first lock after the search is completed, (b) if the entry is found in one of the at least two queues, obtaining a second lock on the entry, and (c) if the entry not found in one of the at least two queues, obtaining a new entry, and attempting to add the new entry to the hash table. The method further includes determining if a race condition is encountered when performing step (b) or step (c) due to the second thread and when the race condition is present, repeating steps (a), (b) and (c), and when the race condition is not present, returning a pointer to either the found entry or the new entry for use in the I/O operation.

Further embodiments include a computer system configured to carry out one or more aspects of the above method, and a non-transitory computer-readable storage medium containing computer-readable code executable by one or more computer processors to carry out one or more aspects of the above method.

FIG. 1A depicts a block diagram of a computer system 100 in which one or more embodiments of the present disclosure may be utilized. Computer system 100 includes a data center 102.

Datacenter 102 includes a management network 126, a data network 122, a gateway 124, a virtualization manager 130 and host(s) 104, each of which includes virtual machines (VMs) 120.

Networks 122, 126, in one embodiment, each provide Layer 3 connectivity in accordance with the TCP/IP model, with internal physical switches and routers not being shown. Although the management and data network are shown as separate physical networks, it is also possible in some implementations to logically isolate the management network from the data network, e.g., by using different VLAN identifiers.

Gateway 124 provides VMs 120 and other components in data center 102 with connectivity to one or more networks used to communicate with one or more remote data centers. Gateway 124 may manage external public Internet Protocol (IP) addresses for VMs 120 and route traffic incoming to and outgoing from data center 102 and provide networking services, such as firewalls, network address translation (NAT), dynamic host configuration protocol (DHCP), and load balancing. Gateway 124 may use data network 122 to transmit data network packets to hosts 104. Gateway 124 may be a virtual appliance, a physical device, or a software module running within host 104.

Virtualization manager 130 communicates with hosts 104 via a network, shown as a management network 126, and carries out administrative tasks for data center 102 such as managing hosts 104, managing VMs 120 running within each host 104, provisioning VMs 120, migrating VMs 120 from one host to another host, and load balancing between hosts 104. Virtualization manager 130 may be a computer program that resides and executes in a central server in data center 102 or, alternatively, virtualization manager 130 may run as a virtual computing instance (e.g., a VM) in one of hosts 104. Although shown as a single unit, virtualization manager 130 may be implemented as a distributed or clustered system. That is, virtualization manager 130 may include multiple servers or virtual computing instances that implement management plane functions.

Each of the hosts 104 in the data center 102 may be constructed on a server-grade hardware platform 106, such as an x86 architecture platform. For example, hosts 104 may be geographically co-located servers on the same rack.

Each host 104 has a hardware platform 106 which includes components of a computing device such as one or more processors (CPUs) 108, a network interface 112, storage system 114, a host bus adapter (HBA) 115, system memory 110, and other I/O devices such as, for example, USB interfaces (not shown).

Network interface 112 enables host 104 to communicate with other devices via a communication medium, such as data network 122 or management network 126. Network interface 112 may include one or more network adapters, also referred to as Network Interface Cards (NICs). In certain embodiments, data network 122 and management network 126 may be different physical networks as shown, and hosts 104 may be connected to each of data network 122 and management network 126 via separate NICs or separate ports on the same NIC. In certain embodiments, data network 122 and management network 126 may correspond to the same physical network, but different network segments, such as different VLAN segments.

Storage system 114 represents persistent storage devices (e.g., one or more hard disks, flash memory modules, solid-state disks, NVMe disks, Persistent Memory module, and/or optical disks). Storage system 114 may be internal to host 104 or may be external to host 104 and shared by a plurality of hosts 104, coupled via HBA 115 or network interface 112, such as over a network. Storage system 114 may be a storage area network (SAN) connected to host 104 by way of a distinct storage network (not shown) or via data network 122, e.g., when using iSCSI or FCoE storage protocols. Storage system 114 may also be a network-attached storage (NAS) or another network data storage system, which may be accessible via network interface 112.

System memory 110 is hardware allowing information, such as executable instructions, configurations, and other data, to be stored and retrieved. System memory 110 contains programs and data when CPU 108 is actively using them. System memory 110 may be volatile memory or non-volatile memory. System memory 110 includes a cache management data structure (DS) 136, further described below in reference to FIG. 2. System memory 110 also includes a cache 138 where data and metadata of the data are stored. Although cache 138 is shown as located within system memory 110, cache 138 may be implemented in other components of computer system 100, such as in an external storage or memory device, shared by a plurality of hosts 104, and coupled to host 104 via HBA 115 or NIC 112.

Host 104 is configured to provide a virtualization layer, also referred to as a hypervisor 116, that abstracts processor, memory, storage, and networking resources of hardware platform 106 into multiple VMs 1201 to 120N (collectively referred to as VMs 120 and individually referred to as VM 120) that run concurrently on the same host. Hypervisor 116 may run on top of the operating system in host 104. In some embodiments, hypervisor 116 can be installed as system-level software directly on hardware platform 106 of host 104 (often referred to as "bare metal" installation) and be conceptually interposed between the physical hardware and the guest operating systems executing in the virtual machines. In some implementations, hypervisor 116 may comprise system-level software as well as a "Domain 0" or "Root Partition" virtual machine (not shown) which is a privileged virtual machine that has access to the physical hardware resources of the host and interfaces directly with physical I/O devices using device drivers that reside in the privileged virtual machine. Although the disclosure is described with reference to VMs, the teachings herein also apply to other types of virtual computing instances (VCIs), such as containers, Docker containers, data compute nodes, isolated user-space instances, namespace containers, and the like. In certain embodiments, instead of VMs 120, the techniques may be performed using containers that run on host 104 without the use of a hypervisor and separate guest operating systems running on each.

During use, VMs 120 issue input-output operations (I/Os) to their respective virtual disks, which are provisioned in storage system 114 as virtual machine disk files, shown as VMDKs 126. Hypervisor 116, through its "I/O stack" or "storage layer" 134, translates the I/Os sent from VMs 120 into I/Os that target one or more storage blocks representing VMDK 126 corresponding to the virtual disk of VM 120 issuing the I/O. Hypervisor 116 also includes a cache module 132 that employs a reserved area in system memory 110 to manage cache management data structure 136 (see FIG. 2) so as to cache data of host 104, such as the read and write data associated with I/Os issued by VMs 120.

Figure 1B:
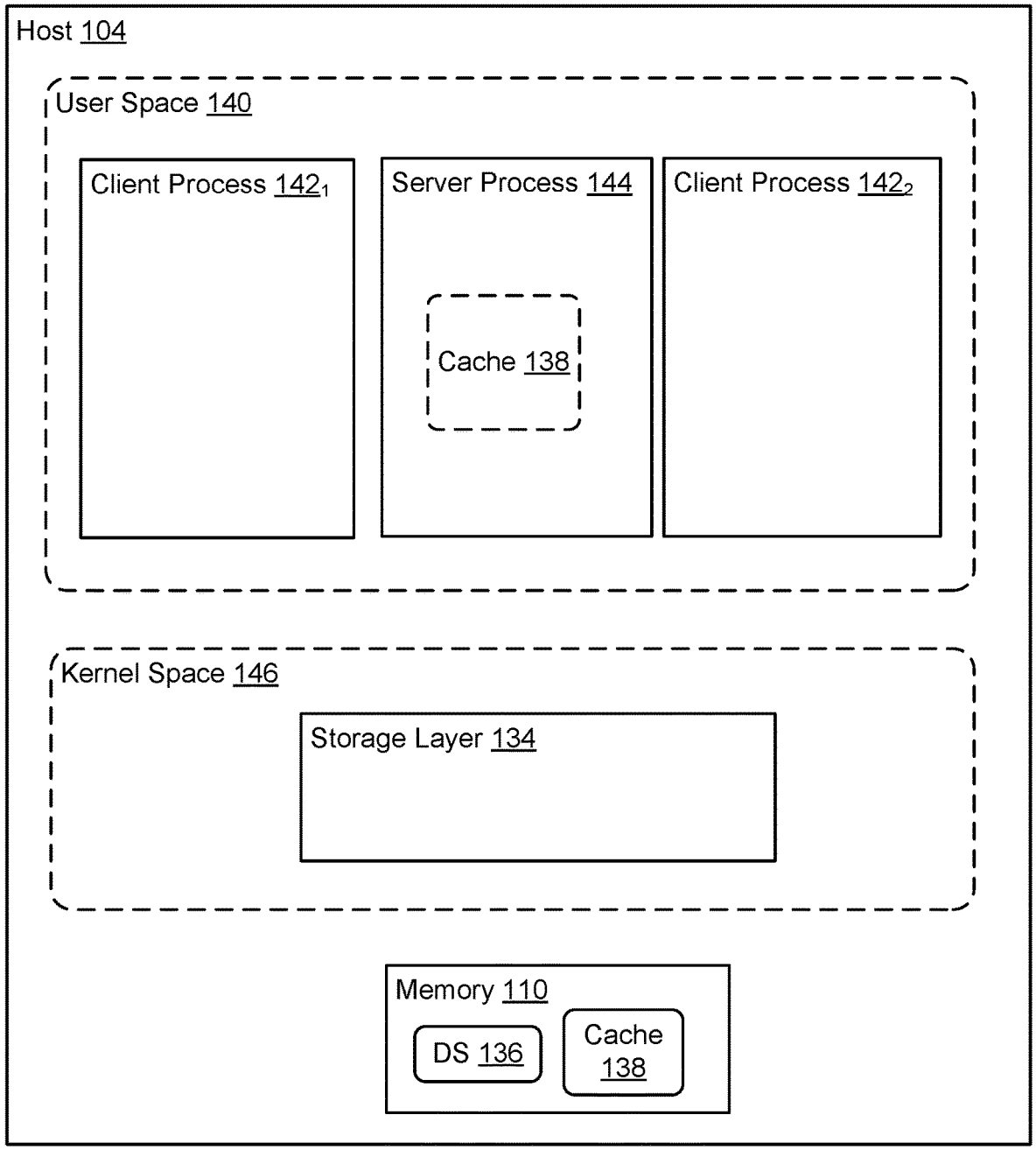
FIG. 1B depicts a block diagram of a host comprising a user space and a kernel space, according to an embodiment.

FIG. 1B depicts a block diagram of host 104 comprising user space 140 and kernel space 146 of host 104, according to an embodiment. Kernel space 146 comprises software components and address spaces of those components that are part of a privileged operating system (OS) kernel of host 104. The address spaces may be virtual or physical, and correspond to addresses in system memory 110. As known in the art, virtual memory is an abstraction of physical memory that gives a process 142/144 the illusion of having large or infinite memory available. Virtual memory addresses are mapped to physical memory addresses by page tables stored in system memory 110. The OS of host 104 is hypervisor 116. In embodiments, the OS may be a conventional desktop OS, like Microsoft Windows, Mac OS, or Linux.

Kernel space 146 includes the storage layer 134 that is configured to perform I/O with respect to storage system 114. Kernel space 146 can include components that are not shown, such as a memory management subsystem, a process scheduling subsystem, privileged device drivers, etc.

User space 140 comprises a plurality of user space processes, such as client processes 142₁, 142₂, and server process 144 that run outside of the kernel space 146. Examples of such user space processes include application programs, shared libraries, virtual machines (VMs), etc. In an embodiment, rather than connecting to hardware of computer system 100 through storage layer 134, user space processes 142/144 may connect to the hardware of computer system 100 through single root input/output virtualization (SR-IOV) technology. User processes 142₁, 142₂ and server process 144, as well as any kernel space processes, execute on the one or more CPUs 108.

Three user space processes 142₁, 142₂, and 144 are shown, although any number of user space processes may run concurrently. At least one of the user space processes may be a server process 144, and one or more other user space processes may be client processes 142₁ and 142₂. Server process 144 comprises a cache, and that cache may be cache 138, which is a portion of system memory 110 corresponding to a portion of the virtual or physical memory address space of server process 144, as shown by the dotted lines of cache 138 within server process 144, and by the solid lines of cache 138 within system memory 110. It may be advantageous for server process 144 to perform I/O operations for client process 142 because performing I/O operations centrally allows for running of central algorithms, which are easier to create and are less error prone.

In order for client process 142 to perform an I/O operation on storage system 114 through server process 144, server process 144 needs to be able to obtain data from client process 142 and/or to be able to provide data to client process 142. One way for server process 144 to obtain data from client process 142 is to map a portion of virtual address space of client process 142 into the virtual address space of server process 144. The mapping of a portion of server process 144 virtual address space to a portion of a client process 142 virtual address space may be accomplished, for example, by mapping each virtual address in the portion of server process 144 to a page table, that page table being the same page table to which virtual addresses of client process 142 point. Mapping a virtual address of a first process to a virtual address of another process, in effect creates a shared memory and allows the first process to access and modify data of the other process by referencing the address space of the first process. One method of performing such a mapping is described in U.S. application Ser. No. 16/256,713, titled "SYSTEM AND METHODS OF ZERO-COPY DATA PATH AMONG USER LEVEL PROCESSES," hereby incorporated by reference in its entirety.

Figure 2A:
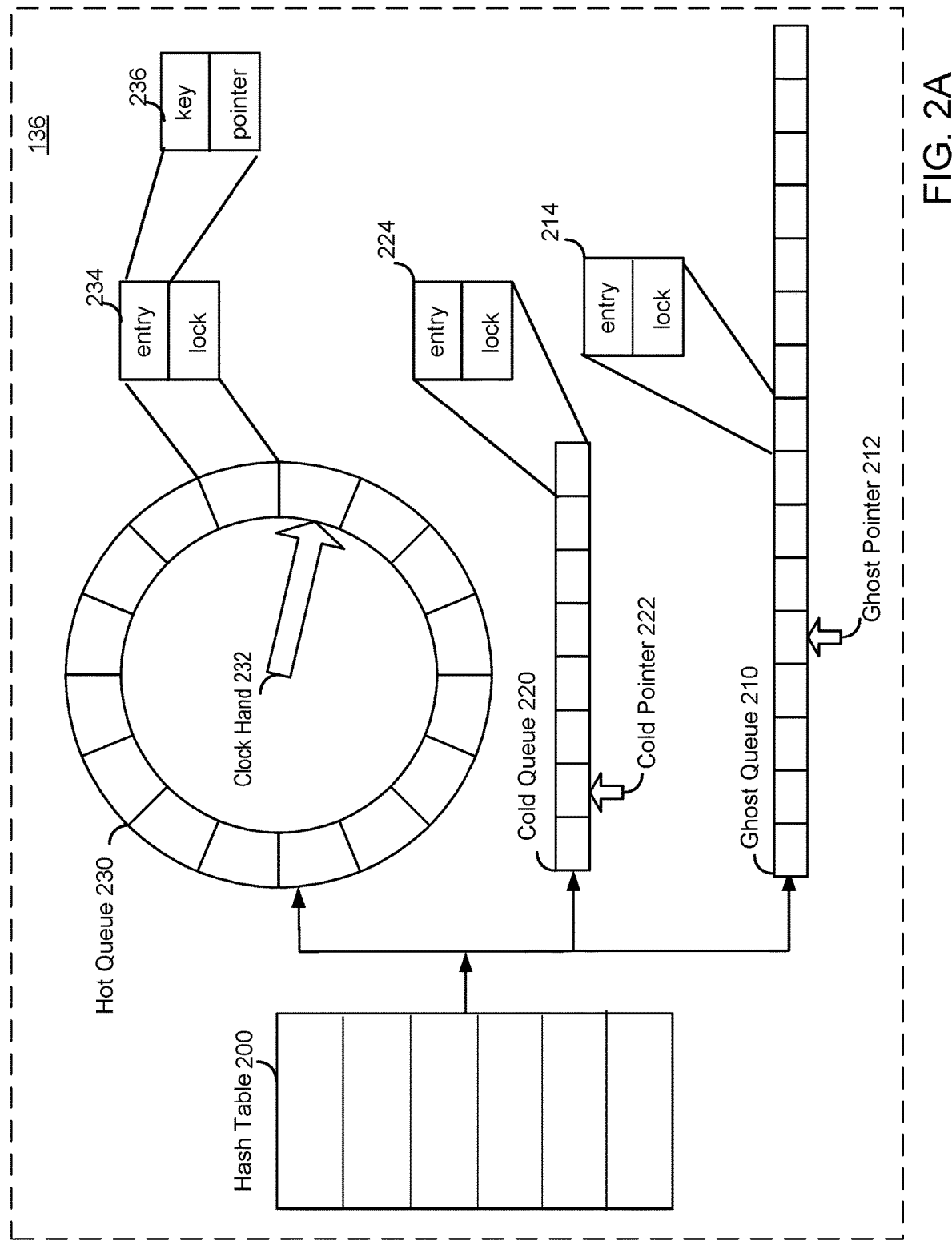
FIG. 2A depicts a block diagram of an exemplary cache management data structure, according to embodiments.

FIG. 2A depicts a block diagram of an exemplary cache management data structure 136, according to embodiments. Cache management data structure 136 includes a hash table 200, a ghost queue 210, a cold queue 220, and a hot queue 230.

Hash table 200 includes entries that are indexed according to a hash of a location identifier or key, such as a logical block address (LBA) or in some embodiments, just the location identifier. In FIG. 2A, hash table 200 provides a pointer or reference to one of the queues, hot queue 230, cold queue 220, or ghost queue 210 containing an entry that was found in hash table 200. Hash table 200 is described in more detail in reference to FIG. 2B.

The location identifier may differ depending on the application. For example, for the application of caching I/Os directed to storage system 114, the location identifier may include an LBA representing the target location for an issued I/O, such as an I/O to storage system 114. For the application of mapping a virtual address of a first process active in CPU 108, such as server process 144, to a virtual address of a second process, such as process 142, the location identifier may include the virtual address of the second process. The location identifier may map the first process to a page table of a virtual address space of the second process. For the application of mapping a region of a virtual address space of a first process to a region of virtual address space of a second process, the location identifier may include a pair consisting of (a) an offset within the virtual address space of the second process, and (b) a process ID of the second process. A location identifier may also be a hash value or a memory page number.

Each element in hot queue 230, cold queue 220, and ghost queue 210 includes an entry and a lock object. For the hot queue and cold queue, the entry includes a key and a pointer to a location of the cache data. The ghost queue only includes a key but does not have a pointer to the location of the cache data. The key is a location identifier, such as an LBA, of the cache data. The lock object has two functions, Lock( ) and Unlock( ) that serve to control access to the entry. If the Lock( ) function is called and is successful, then the caller has exclusive access to the element until it invokes the Unlock( ) function on the element. Thus, multiple threads can separately lock different elements without any conflict.

Figure 2B:
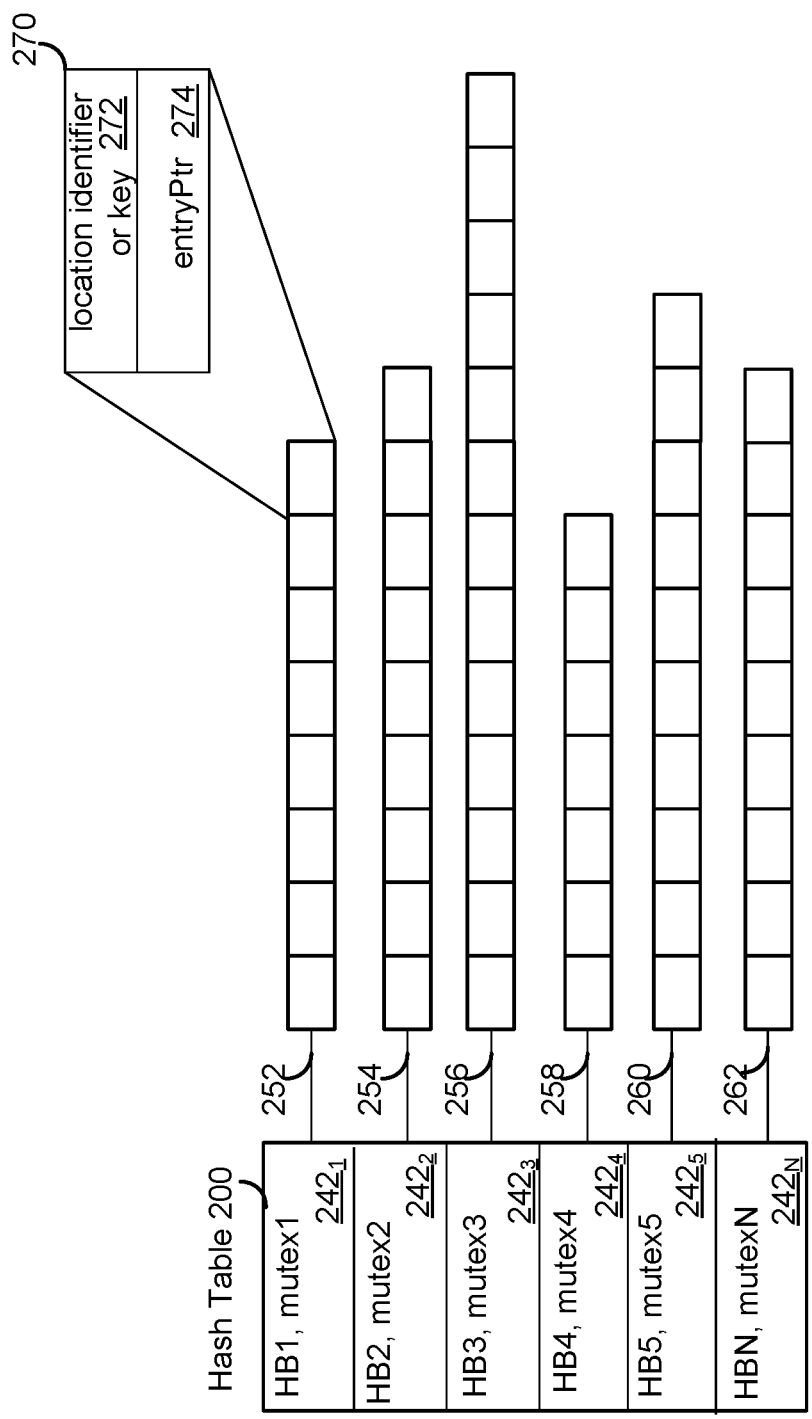
FIG. 2B depicts the structure of the hash table in an embodiment.

FIG. 2B depicts the structure of the hash table in an embodiment. The structure of hash table 200 includes one or more hash buckets, HB1-HBN 242₁₋ₙ. Each hash bucket HB1-HBN 242₁₋ₙ includes a mutex object, which is a mutual exclusion object that has two functions Lock( ) and Unlock( ) for controlling access to the hash bucket HB1-HBN 242₁₋ₙ. It should be noted that though certain aspects are described with respect to a mutex object, any type of appropriate lock object may be used. When a caller invokes the Lock( ) function and is successful, the caller has exclusive access to the hash bucket and its associated hash list, until the caller invokes the Unlock( ) function. Thus, multiple concurrent threads can lock different hash buckets without conflict. Each hash list 252-262 includes entries 270 and each entry 270 contains a location identifier 272, also referred to as a key, and an entry pointer 274 to one of the three queues.

Figure 3:
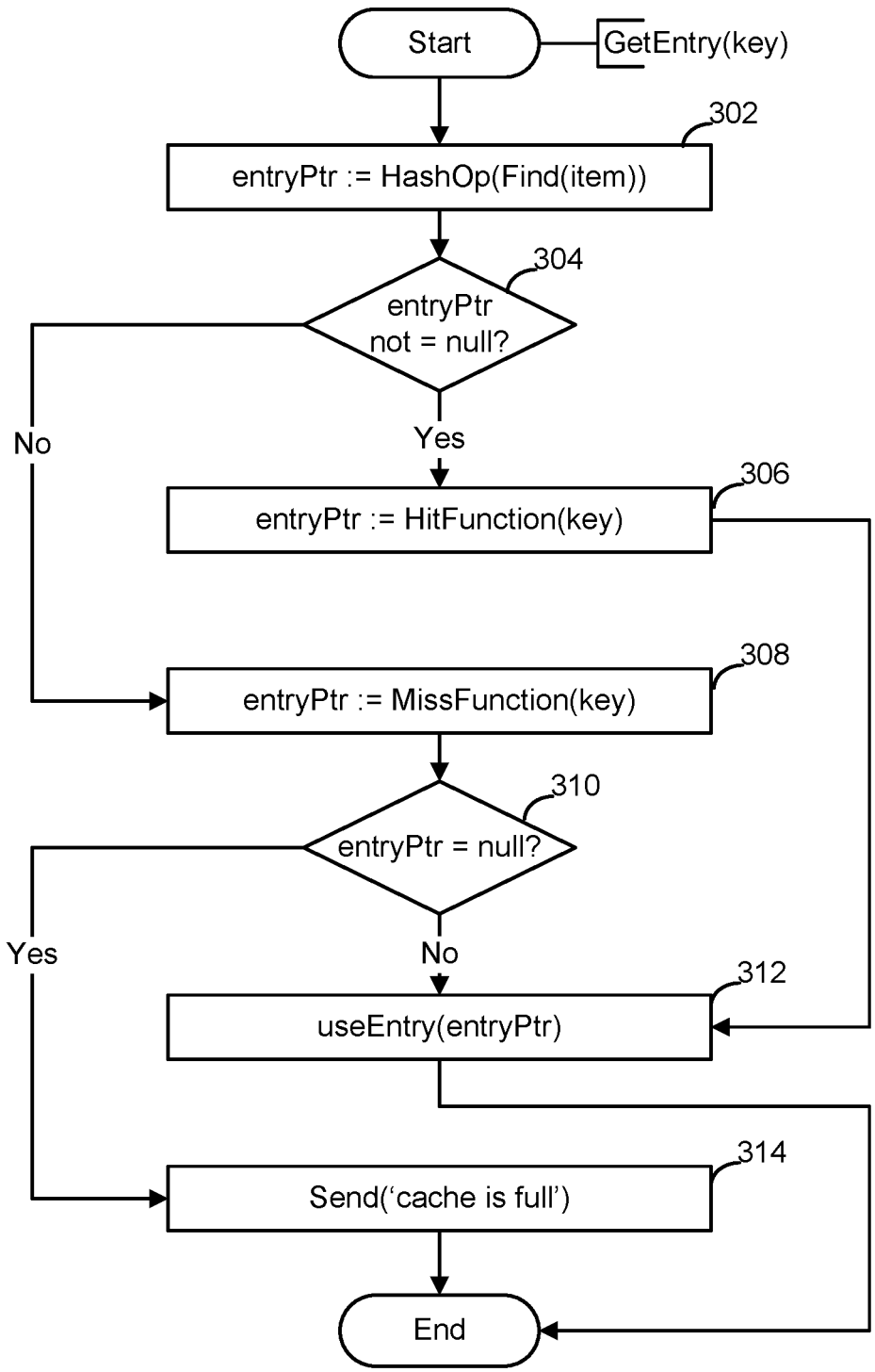
FIG. 3 depicts a flow of operations for a function GetEntry(key) for getting a cache entry, in an embodiment.

FIG. 3 depicts a flow of operations for a function GetEntry(key) for getting a cache entry, in an embodiment. In step 302, the function calls a HashOp(Find(item)) function to obtain an entry pointer from hash table 200. The HashOp function is further described in regard to FIG. 9. In step 304, the function determines whether the entry pointer that was found is null, where a null pointer is a special pointer that does not point to anything. It should be noted that though certain aspects are described with respect to determining if a null pointer is found to determine that an entry is not found in the hash table 200, other aspects may use other known mechanisms to determine whether the entry pointer is found in hash table 200. If the pointer is not null, then the entry is in either hot queue 230 or cold queue 220 of cache 138, and the HitFunction is called in step 306. The HitFunction is described with respect to FIG. 4. If the entry pointer is null, then the entry is not in hot queue 230 or cold queue 220, and the MissFunction is called in step 308. The MissFunction is described with respect to FIG. 5. After the HitFunction is called, then in step 312, the pointer that was found is used to obtain the cache data from cache 138 pointed to by the entry pointer. After the MissFunction is called in step 308, the function determines whether the MissFunction returned a null entry pointer in step 310. If so, then a message is returned that cache 138 is full in step 314 and an allocation of a cache entry is not possible. If not, then in step 312, the item pointed to by the entry pointer is used to store cache data in cache 138. In one embodiment, hypervisor 116 performs the GetEntry function. In another embodiment, server process 144 performs the GetEntry function.

Figure 4:
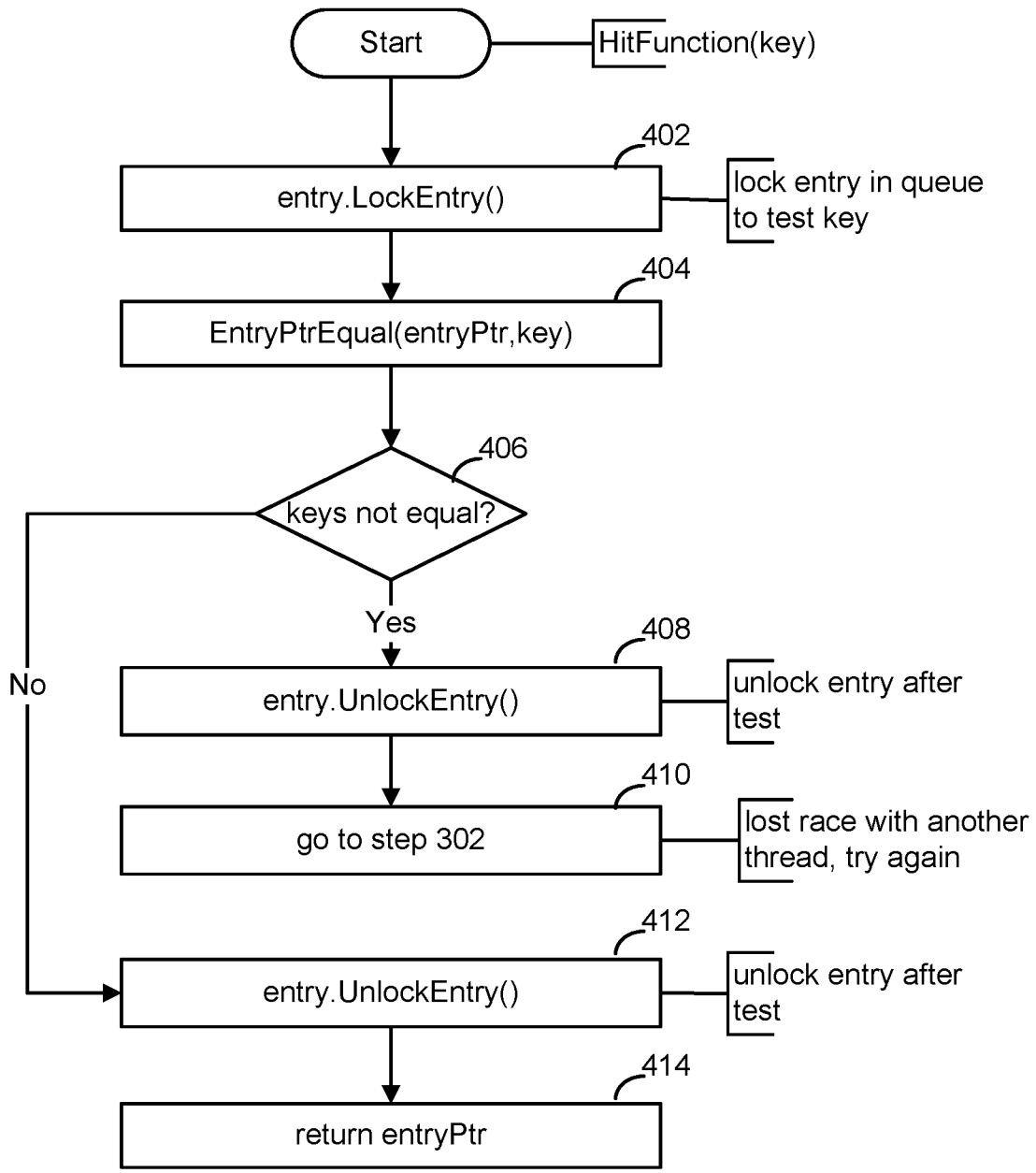
FIG. 4 depicts a flow of operations for a hit function, in an embodiment.

FIG. 4 depicts a flow of operations for the HitFunction, in an embodiment. In step 402, the function locks the entry that was found in step 302 of FIG. 3. Locking the entry involves invoking a Lock( ) function on the lock object in entry 224, 234. In step 404, the function compares the key in the HitFunction call with the key in the entry. If the two keys are not equal as determined in step 406 then in step 408, the entry is unlocked, and the function jumps to step 302 to try again. The function jumps to step 302 because another thread executing the GetEntry(key) function used the entry for a different key, which is indicated by the two keys not being equal. Thus, losing the race causes a retry. This race condition is discussed in more detail in reference to FIG. 14. If the two keys are equal, then in step 412 the entry is unlocked by invoking an Unlock( ) function on the lock object in the entry and a pointer to the entry is returned in step 414. The entry pointer is then used to obtain the data associated with the cache entry.

Figure 5:
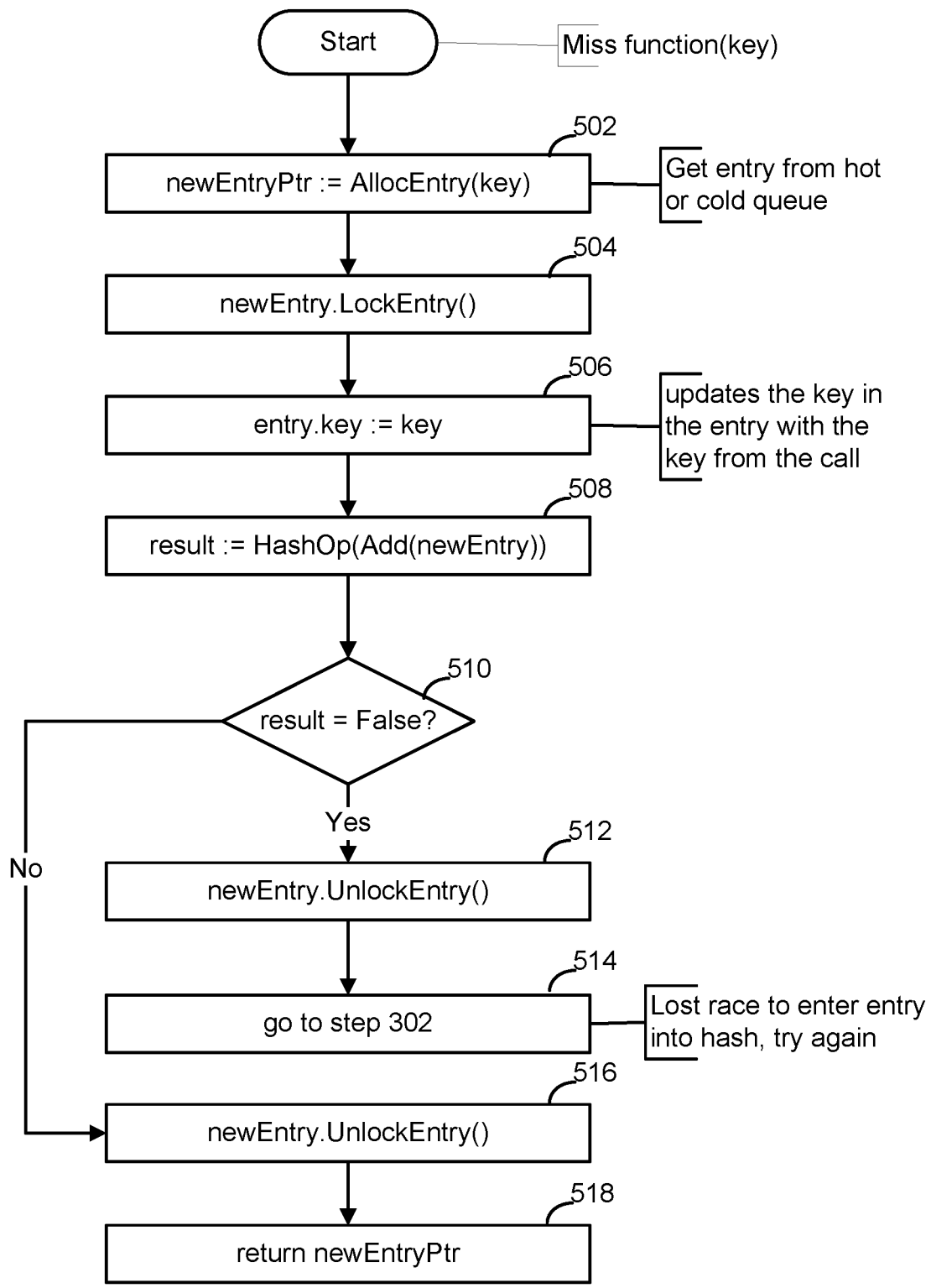
FIG. 5 depicts a flow of operations for a miss function, in an embodiment.

FIG. 5 depicts a flow of operations for a MissFunction, in an embodiment. In step 502, the function obtains a new entry from either hot queue 230 or cold queue 220. This step is described in more detail in reference to FIG. 6. In step 504, the function locks the new entry using the lock object in the entry. In step 506, the function assigns the key passed in the call to the key associated with the entry. In step 508, the function then attempts to add the new entry to the hash table by calling the HashOp function. In step 510, the result is examined, and if false (meaning that HashOp function was not successful at performing the 'Add' function in step 1008 of FIG. 10), then the new entry is unlocked in step 512, and the function jumps to step 302 to try again in step 514. The GetEntry function is called again because the thread running the MissFunction lost the race with another thread to enter the entry into hash table 200, which is indicated by the HashOp(Add(newEntry)) function returning a false as its result. This race condition is discussed in more detail in reference to FIG. 14. If the result as determined in step 510 is true (i.e. the 'Add' was successful), then the new entry is unlocked and the entry pointer for the new entry is returned for use in an I/O operation.

Figure 6:
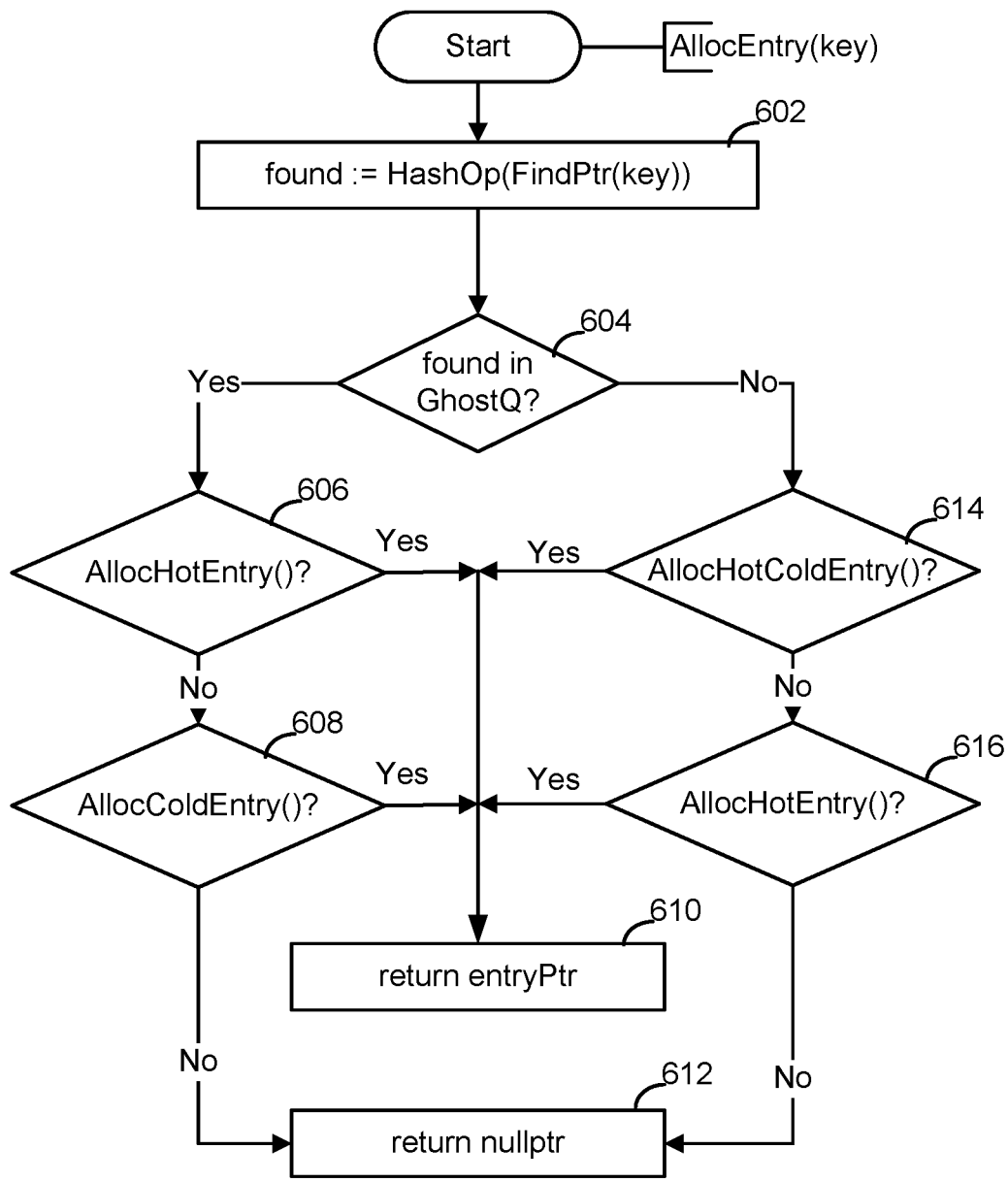
FIG. 6 depicts a flow of operations for allocating a cache entry, in an embodiment.

FIG. 6 depicts a flow of operations for allocating a cache entry, in an embodiment. In step 602, the function calls the HashOp function to find a pointer to a key in hash table 200. The result of the HashOp function is assigned to 'found'. If 'found' indicates that the key that was found was in ghost queue 210 as determined in step 604, then the function attempts to allocate an entry from hot queue 230. If the key was not found in ghost queue 210 then the function attempts to allocate an entry from cold queue 220. In step 606, the function attempts to allocate an entry from hot queue 230. This step is further described in reference to FIG. 7. If allocating an entry from hot queue 230 succeeds, then the function returns the entry pointer in step 610. In step 608, the function attempts to allocate an entry from hot queue 230 if allocating an entry from hot queue 230 failed. If allocating an entry from cold queue 220 succeeds, then the function returns the entry pointer in step 610. In step 612, if allocating from both hot queue 230 and cold queue 220 fails, then the function returns a null pointer. In step 614, the function attempt to allocate an entry from cold queue 220 and in step 616 the function attempts to allocate an entry from hot queue 230 if the attempt from cold queue 220 failed. If either succeeds, the function returns the entry pointer in step 612.

Figure 7:
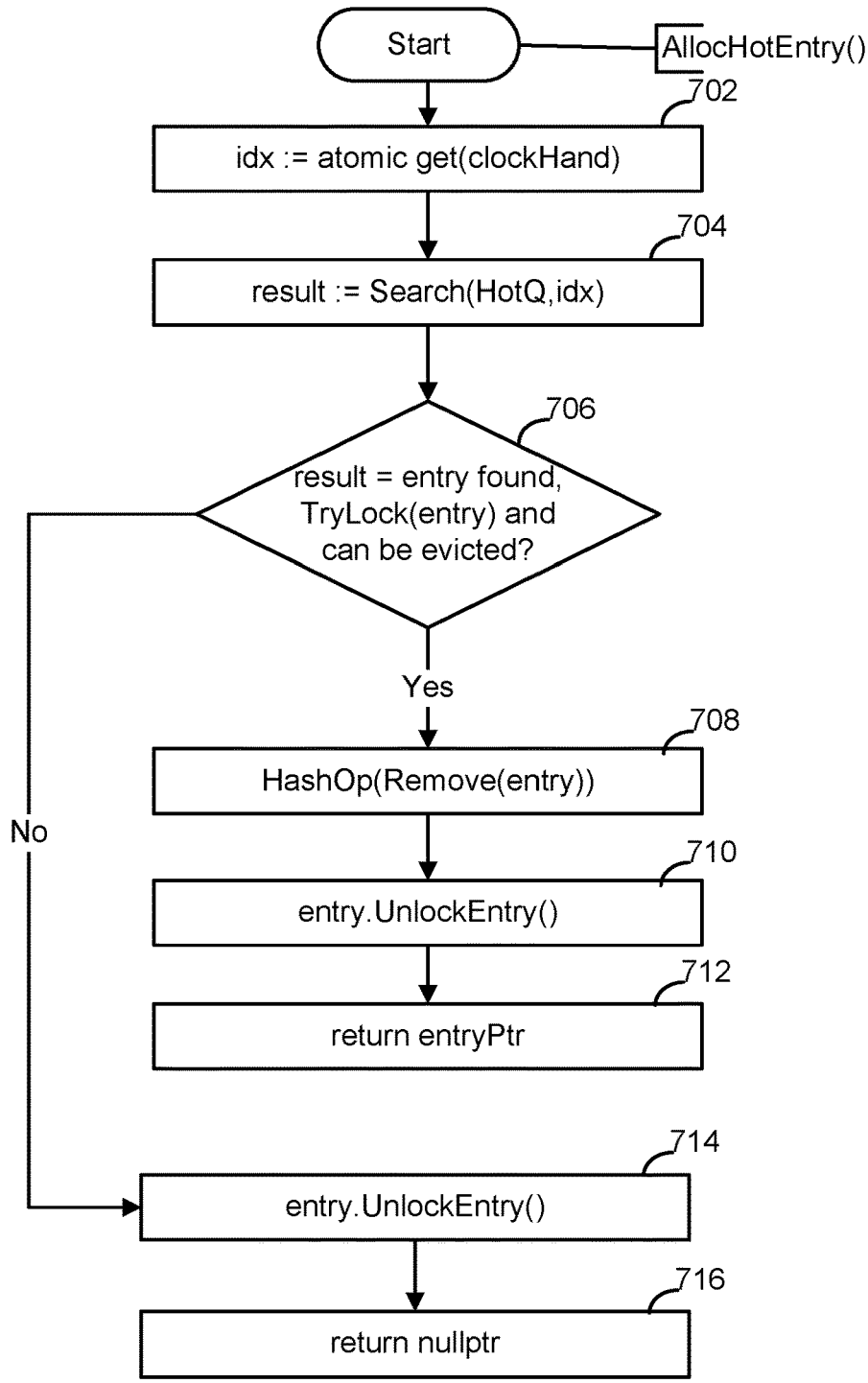
FIG. 7 depicts a flow of operations for allocating a hot queue entry, in an embodiment.

FIG. 7 depicts a flow of operations for allocating a hot queue entry, in an embodiment. In step 702, the function obtains the clock hand 232 for hot queue 230 and assigns it to an index variable, idx. The function employs an atomic increment operation (i.e., an operation that atomically increments its value by 1 and returns its old value) to obtain clock hand 232 so that any thread of the multiple threads running can obtain and advance the clock hand 232 without interference from any other thread. In addition, each time clock hand 232 is moved, the index is again acquired in an atomic operation (e.g., a fetch-and-add operation). In step 704, the function searches hot queue 230 using the index for a result that meets certain conditions. In one embodiment, these conditions are that the TryLock(entry) operation succeeds and that the entry can be evicted from hot queue 230, where the TryLock function returns a Boolean indicating whether an attempt to obtain a lock on the entry was successful. In step 706, if the conditions are met, the function calls HashOp in step 708 to remove the entry from hash table 200 and in step 710 unlocks the entry. In step 712, the function returns the found entry. If as determined in step 706, no entry can be found in hot queue 230 that meets the conditions, the function unlocks any entry that was found but did not meet the conditions, in step 714 and returns the null pointer in step 716. Thus, the AllocHotEntry function attempts to obtain an entry from hot queue 230, but may not succeed.

Figure 8:
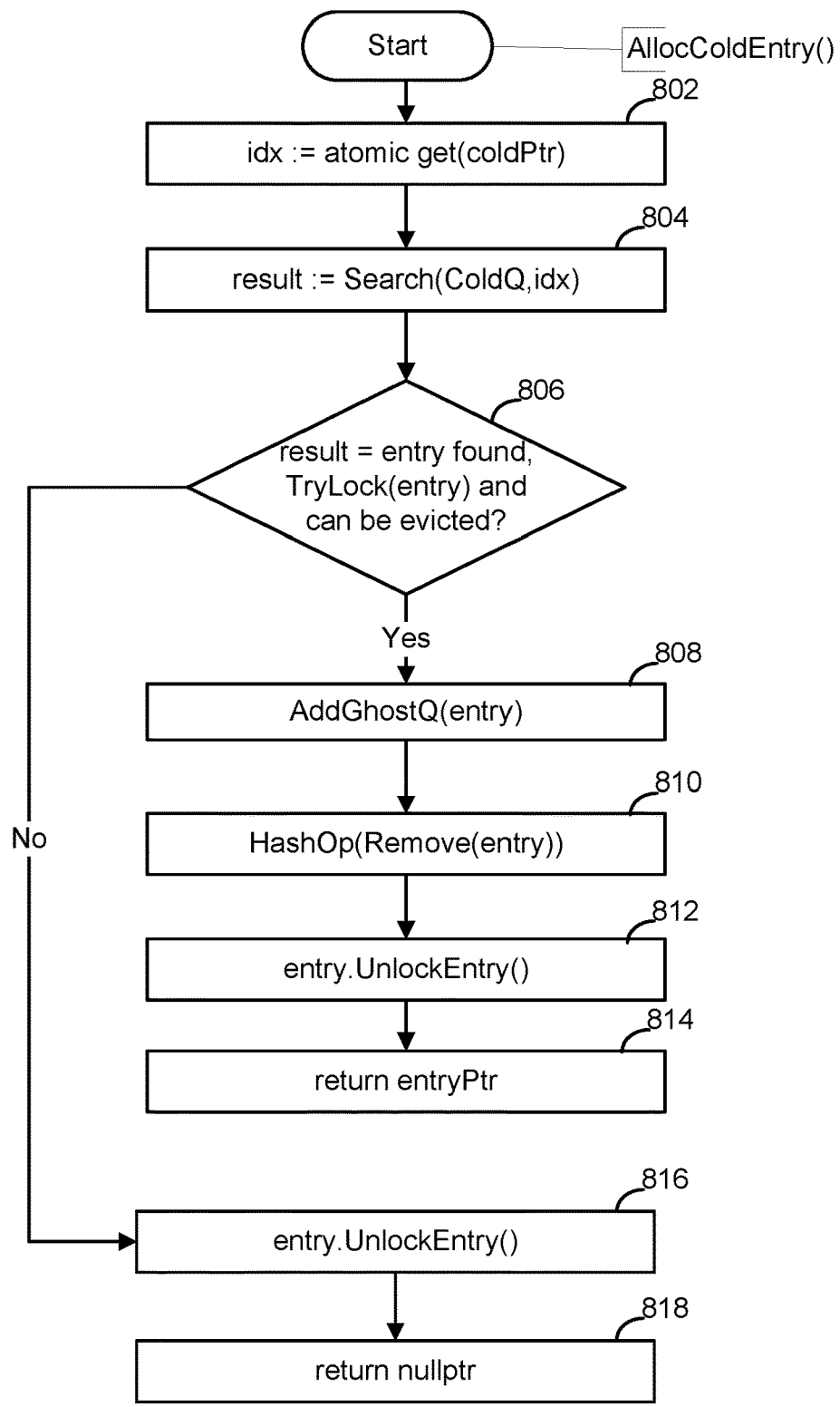
FIG. 8 depicts a flow of operations for allocating a cold queue entry, in an embodiment.

FIG. 8 depicts a flow of operations for allocating a cold queue entry, in an embodiment. In step 802, the function uses an atomic increment operation to obtain the cold queue pointer 222 and assigns the pointer to an index, idx. In step 804, the function searches cold queue 220 using the index using an atomic operation to advance the cold queue pointer. The result of the search is assigned to 'result'. In step 806, the function determines whether the 'result' meets certain conditions. In one embodiment, those conditions are that the TryLock(entry) operation succeeds and that the entry can be evicted. In step 808, if as determined the result meets the conditions, then the function adds the found entry to ghost queue 210. In step 810, the function removes the found entry from hash table 200 by calling the HashOp function. In step 812, the function unlocks the found entry and in step 814 returns a pointer to the found entry. In step 816, if no entry in cold queue 220 meets the conditions, then the function unlocks any found entry and in step 818, returns a null pointer.

Figure 9:
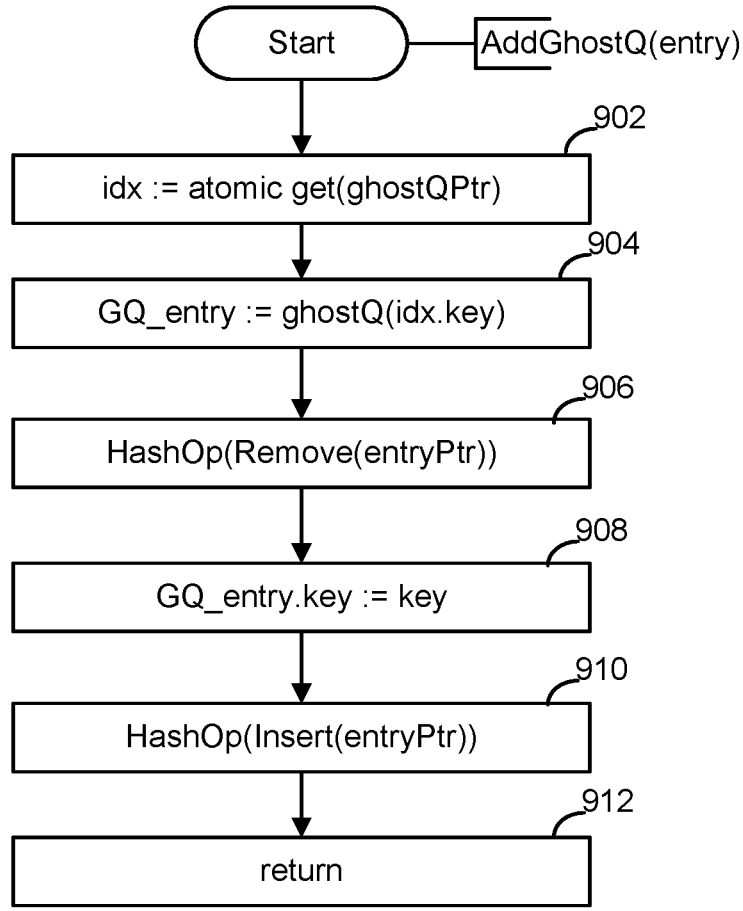
FIG. 9 depicts a flow of operations for adding an entry to the ghost queue, in an embodiment.

FIG. 9 depicts a flow of operations for adding an entry to the ghost queue, in an embodiment. In step 902, the function obtains the ghost queue pointer 212 with an atomic increment operation and assigns it to the variable idx. In step 904, the function obtains the entry from ghost queue 210. In step 906, the function removes the entry (using the entry's pointer) from hash table 200. In step 908, the function updates the key of the ghost queue entry with the key from the entry in the call. In step 910, the function inserts the updated entry (using the entry's pointer) into hash table 200. In step 912, the function returns.

Figure 10:
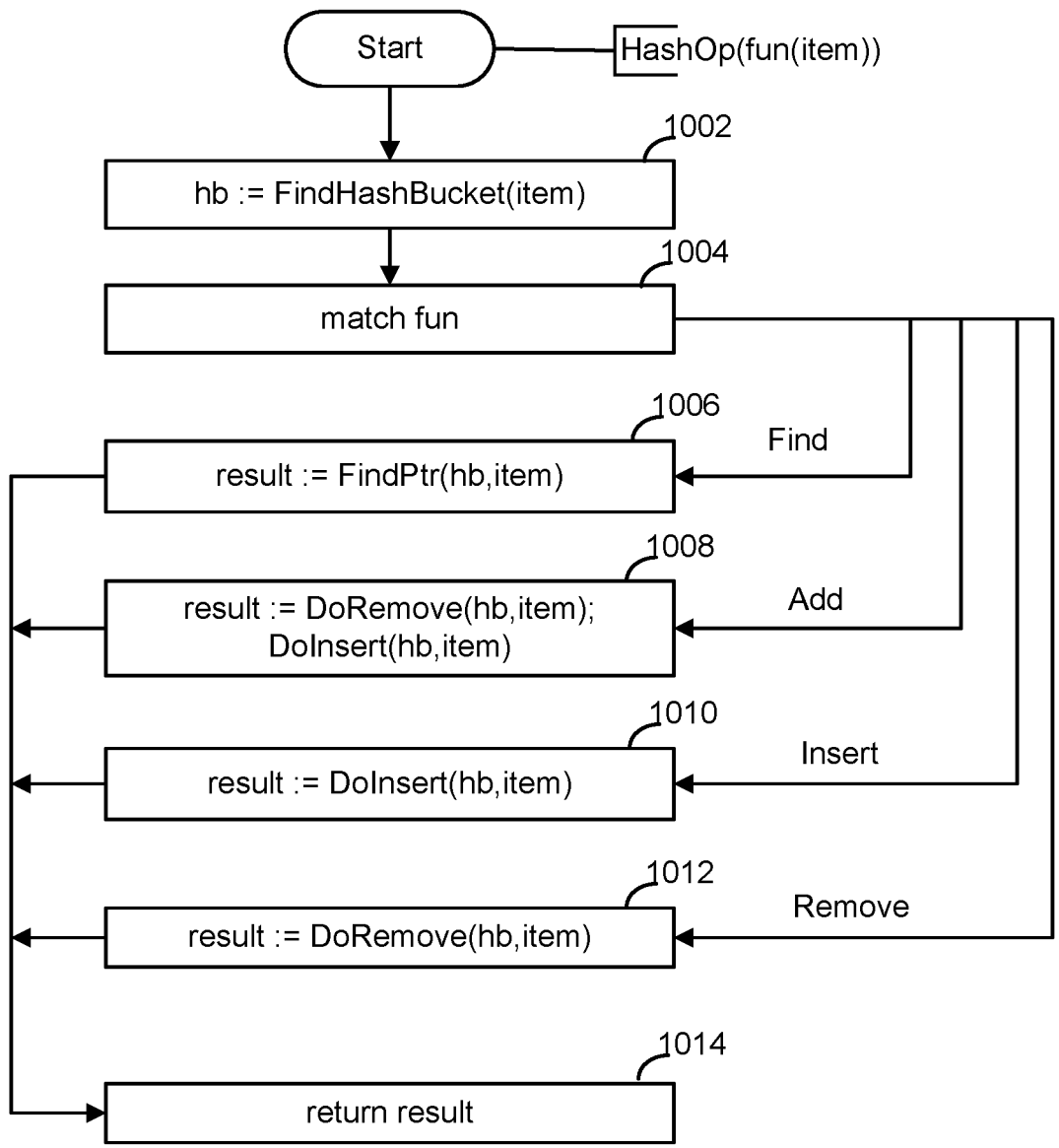
FIG. 10 depicts a flow of operations for a hash operation function, in an embodiment.

FIG. 10 depicts a flow of operations for a hash operation function, in an embodiment. In step 1002, the HashOp function finds the hash bucket $242_{1-N}$ for the given item. The found hash bucket (one of $242_{1-N}$) is assigned to the variable 'hb'. In step 1004, the function matches the function named in the function call with one of the functions, 'Find', 'Add', 'Insert', or 'Remove'. In step 1006, if the function is 'Find', then the FindPtr(hb, item) function is called. This function is further described in reference to FIG. 10. In step 1008, if the function is 'Add', then the functions DoRemove(hb, item) and DoInsert(hb, item) are called. The DoRemove function is further described in reference to FIG. 11 and the DoInsert function is further described in reference to FIG. 12. In step 1010, if the function is 'Insert', then the function DoInsert(hb, item) is called. In step 1012, if the function is 'Remove', then the function DoRemove(hb, item) is called. In step 1014, the result of the function or functions called is returned.

Figure 11:
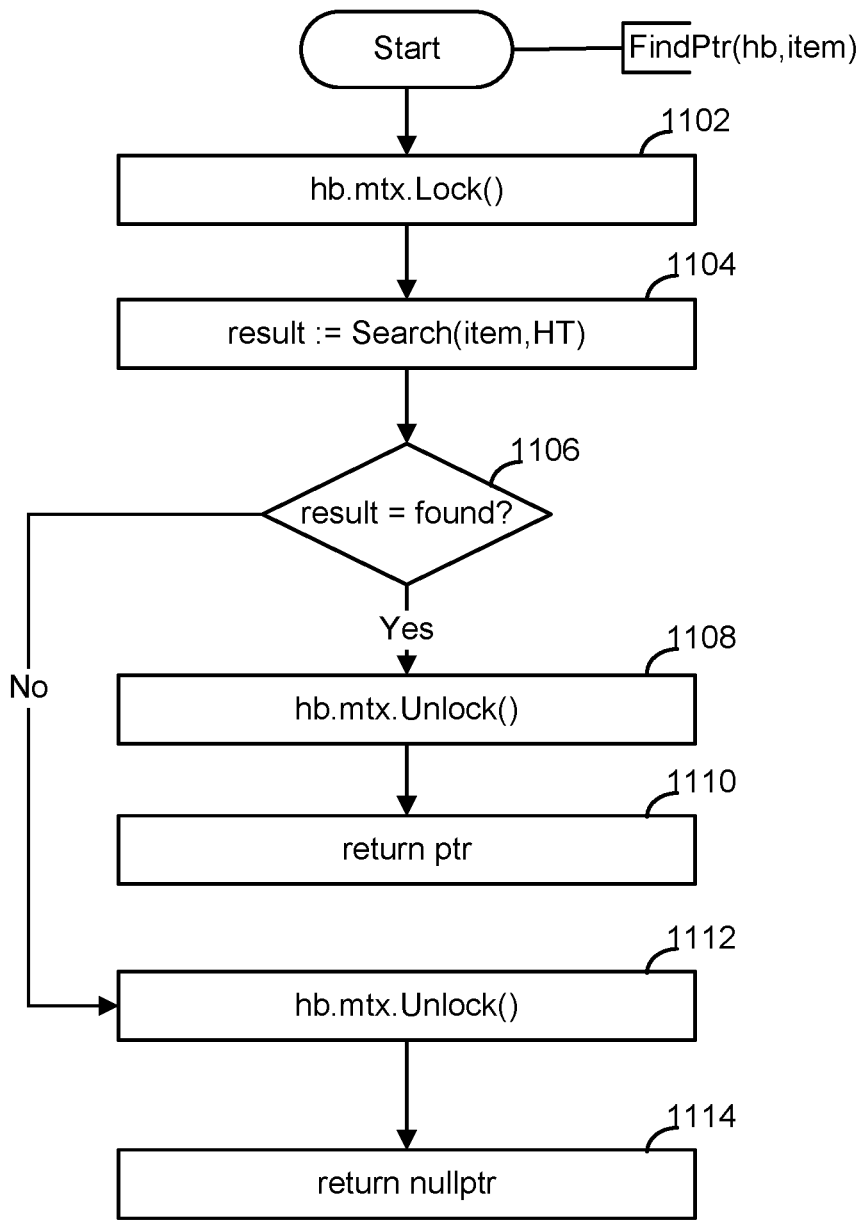
FIG. 11 depicts a flow of operations for a find pointer function, in an embodiment.

FIG. 11 depicts a flow of operations for a find pointer function, in an embodiment. In step 1102, the function obtains a mutex lock on one of the hash buckets $242_{1-N}$ so that it can search hash list 252-262 associated with one of the hash buckets $242_{1-N}$. In step 1104, the function searches hash list 252-262 associated with the locked hash bucket and assigns the result to 'result'. If the result was found as determined in step 1106, the function unlocks the mutex on the one hash bucket $242_{1-N}$ in step 1108 and in step 1110 returns the pointer to the found item. If the result was not found, then the function unlocks the mutex on the one hash bucket $242_{1-N}$ in step 1112 and returns a null pointer in step 1114.

Figure 12:
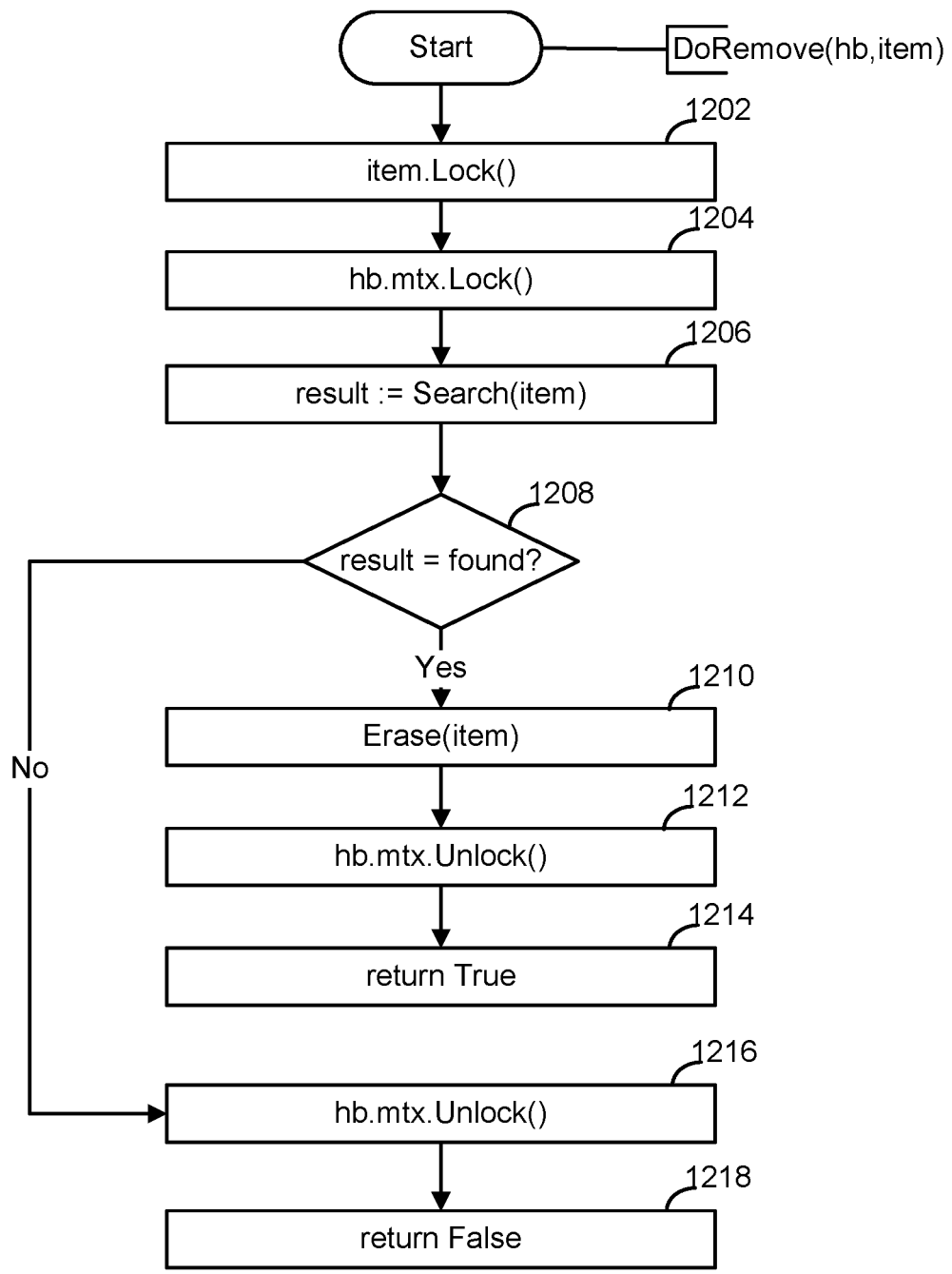
FIG. 12 depicts a flow of operations for a do remove function, in an embodiment.

FIG. 12 depicts a flow of operations for a DoRemove function, in an embodiment. In step 1202, the function locks the item to be removed. In step 1204, the function locks the mutex on hash bucket $242_{1-N}$ containing the item. In step 1206, the function searches list 252-262 associated with hash bucket $242_{1-N}$ to find the item. If as determined in step 1208, the item is found, then in step 1210, the item is erased. In step 1212, the mutex for hash bucket $242_{1-N}$ is unlocked and in step 1214 the function returns true, indicating that the operation was successful. If as determined in step 1208, the item was not found, then in step 1216, the function unlocks the mutex for hash bucket $242_{1-N}$ and in step 1218, returns false, indicating that the operation was unsuccessful. Thus, an item can only be removed from the hash table if it is found first. In addition, the item to be removed is first locked and then the hash bucket is locked.

Figure 13:
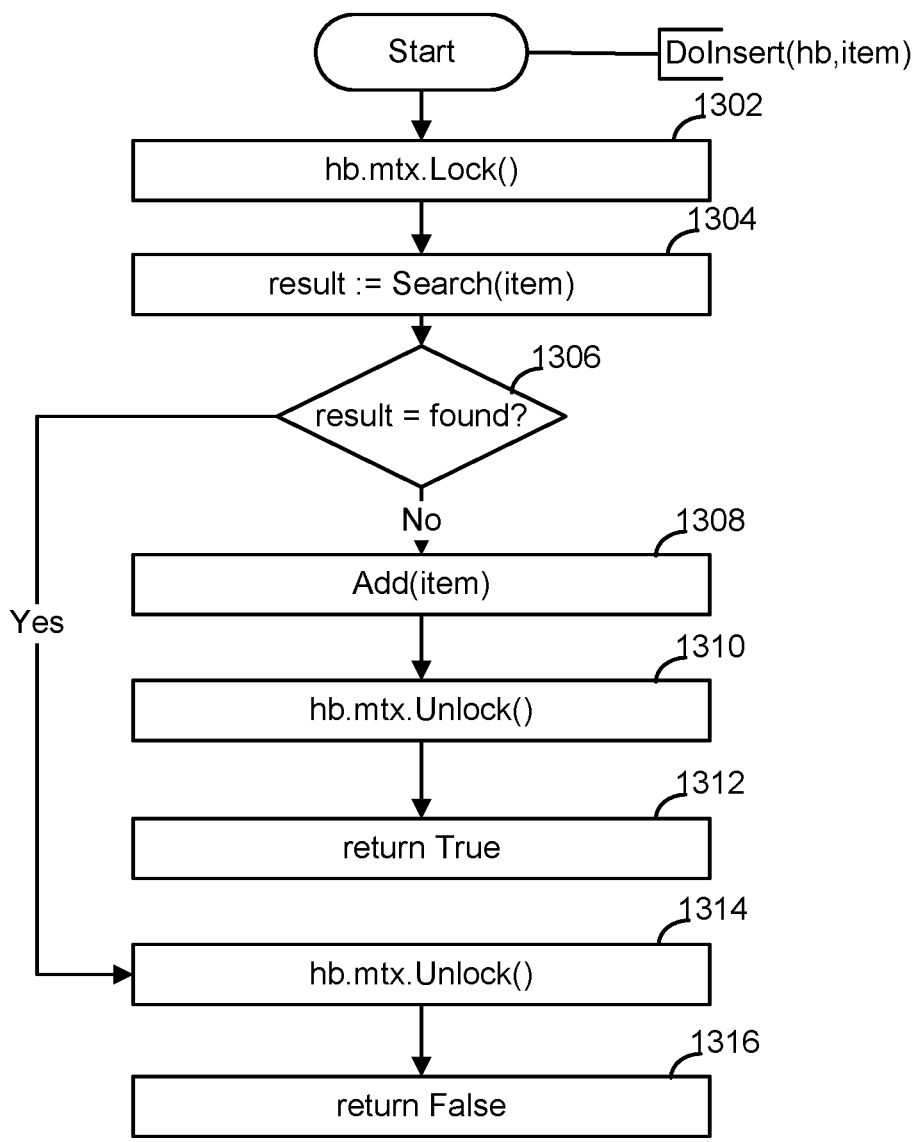
FIG. 13 depicts a flow of operations for a do insert function, in an embodiment.

FIG. 13 depicts a flow of operations for a do insert function, in an embodiment. In step 1302, the function locks the mutex for hash bucket $242_{1-N}$. In step 1304, the function searches list 252-262 associated with hash bucket $242_{1-N}$ for the item. If the item is not found, as determined in step 1306, then the function adds the item to list 252-262 in step 1308 and in step 1310 unlocks mutex on hash bucket $242_{1-N}$ and in step 1312 returns true, indicating that the insert was successful. If the item is found, as determined in step 1306, then the function unlocks the mutex on hash bucket $242_{1-N}$ in step 1314 and in step 1316 returns false, indicating that the insert was not successful because the item was already present in list 252-262. Thus, an item can only be inserted if the item is not found after a search.

Figure 14:
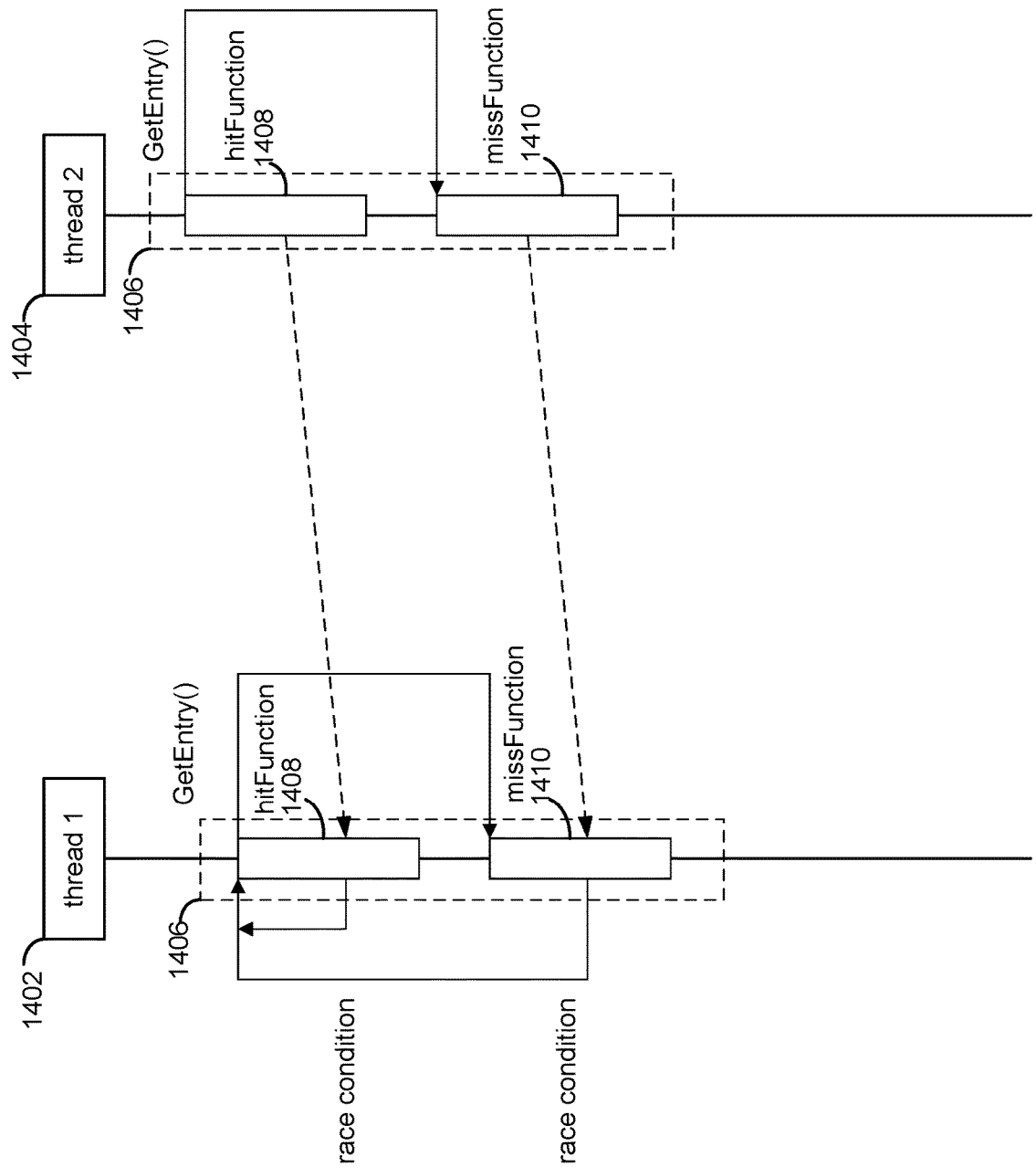
FIG. 14 depicts race conditions between two threads.

FIG. 14 depicts race conditions between two threads. In the figure, thread 1 1402 and thread 2 1404 both execute GetEntry function 1406. However, thread 2 executes Get Entry function 1406 earlier in time than thread 1. A race condition between the two threads can happen either when both threads execute the HitFunction (case A in FIG. 14, which is a race condition on locking an entry) or when both thread execute the MissFunction (case B in FIG. 14, which a race condition on a hash bucket of the hash table).

A race condition happens in the case of HitFunction 1408 (case A) when thread 2 1404 obtains a lock on an entry and changes the entry before thread 1 1402 does. Thread 1 1402 detects this condition in step 406 of FIG. 4 and in step 410 goes back to step 302 to try again. As long as some other thread interferes with thread 1 1402, thread 1 1402 goes back to step 302 to try again until it successfully executes the rest of FIG. 3.

A race condition happens in the case of the MissFunction (case B) when thread 2 1404 successfully adds a new entry to the hash table in step 508 of FIG. 5 before thread 1 1402 does. Thread 1 1402 detects this condition in step 510 of FIG. 5 and in step 514 goes back to step 302 to try again. As long as some other thread interferes with thread 1 1402, thread 1 goes back to step 302 to try again until it successfully executes the rest of FIG. 3.

Thus, by adding locks to each element of the queues making up cache 138, by atomically obtaining a queue pointer for each queue, and by adding a mutex to hash buckets $242_{1-N}$ of hash table 200, cache data structure 136 allows a large number of threads to access cache data structure 136 while sustaining performance of cache 138.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer-readable media. The term computer-readable medium refers to any data storage device that can store data which can thereafter be input to a computer system—computer-readable media may be based on any existing or subsequently developed technology for embodying computer programs in a manner that enables them to be read by a computer. Examples of a computer-readable medium include a hard drive, solid state drive (flash memory device), phase change memory, persistent memory, network attached storage (NAS), read-only memory, random-access memory, a CD (Compact Discs)—CD-ROM, a CD-R, or a CD-RW, a DVD (Digital Versatile Disc), a magnetic tape, and other optical and non-optical data storage devices. The computer-readable medium can also be distributed over a network coupled computer system so that the computer-readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of managing concurrent access by a plurality of threads to a cache data structure, the plurality of threads including a first thread and a second thread, the cache data structure including a hash table and at least two queues, the method comprising:

receiving from the first thread a request to allocate an entry from the cache data structure for use in an I/O operation, the request including a first key that provides location information for the entry, and the entry including a second key and a pointer to a location containing cache data;

(a) accessing the hash table using the first key to determine whether the entry is in the cache data structure by obtaining a first lock on a hash bucket in the hash table to search for the entry, and releasing the first lock after the search is completed;

(b) if the entry is found in one of the at least two queues, obtaining a second lock on the entry;

(c) if the entry not found in one of the at least two queues, obtaining a new entry, and attempting to add the new entry to the hash table;

determining if a race condition is present when performing step (b) or step (c) due to the second thread;

when the race condition is present, repeating steps (a), (b) and (c); and when the race condition is not present, returning a pointer to either the found entry or the new entry for use in the I/O operation.

2. The method of claim 1, wherein determining if the race condition is present comprises, if the entry is in one of the at least two queues and after obtaining the second lock, determining that the race condition is present by comparing the second key to the first key and discovering that the second key is not equal to the first key.

3. The method of claim 1, wherein determining if the race condition is present comprises, if the entry is in one of the at least two queues and after attempting to add the new entry to the hash table, determining that the race condition is present by discovering that the hash table has the new entry.

4. The method of claim 1, wherein the cache data structure further includes a ghost queue and at least two queues including a hot queue and a cold queue, the hot queue being a ring buffer that contains entries having a high frequency of use, the cold queue being a first-in, first-out buffer that contains entries having a frequency of use lower than entries of the hot queue, and the ghost queue being a first-in, first-out buffer that contains entries evicted from the cold queue.

5. The method of claim 4, wherein obtaining a new entry includes:
searching the hash table to determine whether the first key is in the ghost queue;
if the first key is in the ghost queue, allocating an entry from the hot queue; and
if the first key is not in the ghost queue, allocating an entry from the cold queue.

6. The method of claim 5,
wherein the hot queue includes a clock hand that points to entries in the hot queue; and
wherein allocating an entry from the hot queue includes performing an atomic increment operation to obtain the clock hand to access the entries in the hot queue.

7. The method of claim 4, wherein obtaining a new entry includes:
searching the hash table to determine whether the first key is in the ghost queue;
if the first key is in the ghost queue:
attempting to allocate an entry from the hot queue; and
if the entry is not available from the hot queue, allocating an entry from the cold queue; and
if the first key is not in the ghost queue:
attempting to allocate an entry from the cold queue, and
if the entry is not available from the cold queue, allocating an entry from the hot queue.

8. The method of claim 7,
wherein the cold queue includes an entry pointer that points to entries in the hot queue; and
wherein allocating an entry from the hot queue includes performing an atomic increment operation to obtain the entry pointer to access the entries in the hot queue.

9. A computer system comprising
a plurality of processors; and
a memory device containing a cache data structure, the cache data structure including a hash table and at least two queues, the memory device storing instructions which, when executed, cause the processors to carry out a method of managing concurrent access by a plurality of threads to a cache data structure, the plurality of threads including a first thread and a second thread, the method comprising:
receiving from the first thread a request to allocate an entry from the cache data structure for use in an I/O operation, the request including a first key that provides location information for the entry, and the entry including a second key and a pointer to a location containing cache data;
(a) accessing the hash table using the first key to determine whether the entry is in the cache data structure by obtaining a lock on a hash bucket to search for the entry, and releasing the first lock after the search is completed;
(b) if the entry is found in one of the two queues, obtaining a second lock on the entry;
(c) if the entry not found in one of the two queues, obtaining a new entry, and attempting to add the new entry to the hash table;
determining if a race condition is present when performing step (b) or step (c) due to the second thread;
when the race condition is present, repeating steps (a), (b) and (c); and
when the race condition is not present, returning a pointer to either the found entry or the new entry for use in the I/O operation.

10. The computer system of claim 9, wherein determining if the race condition is present comprises, if the entry is in one of the at least two queues and after obtaining the second lock, determining that the race condition is present by comparing the second key to the first key and discovering that the second key is not equal to the first key.

11. The computer system of claim 9, wherein determining if the race condition is present comprises, if the entry is in one of the at least two queues and after attempting to add the new entry to the hash table, determining that the race condition is present by discovering that the hash table has the new entry.

12. The computer system of claim 9, wherein the cache data structure further includes a ghost queue and at least two queues including a hot queue and a cold queue, the hot queue being a ring buffer that contains entries having a high frequency of use, the cold queue being a first-in, first-out buffer that contains entries having a frequency of use lower than entries of the hot queue, and the ghost queue being a first-in, first-out buffer that contains entries evicted from the cold queue.

13. The computer system of claim 12, wherein obtaining a new entry includes:
searching the hash table to determine whether the first key is in the ghost queue;
if the first key is in the ghost queue, allocating an entry from the hot queue; and
if the first key is not in the ghost queue, allocating an entry from the cold queue;
wherein the hot queue includes a clock hand that points to entries in the hot queue;
wherein allocating an entry from the hot queue includes performing an atomic increment operation to obtain the clock hand to access the entries in the hot queue;
wherein the cold queue includes an entry pointer that points to entries in the cold queue; and
wherein allocating an entry from the cold queue includes performing an atomic increment operation to obtain the entry pointer to access the entries in the cold queue.

14. A non-transitory computer readable medium storing instructions that are executable in a computer system, wherein the instructions when executed cause the computer system to carry out a method of managing concurrent access by a plurality of threads to a cache data structure, the plurality of threads including a first thread and a second thread, the cache data structure including a hash table and at least two queues, the method comprising:
receiving from the first thread a request to allocate an entry from the cache for use in an I/O operation, the request including a first key that provides location information for the entry, and the entry including a second key and a pointer to a location containing cache data;
(a) accessing the hash table using the first key to determine whether the entry is in the cache data structure by obtaining a first lock on a hash bucket in the hash table to search for the entry, and
releasing the first lock after the search is completed;
(b) if the entry is found in one of the at least two queues, obtaining a second lock on the found entry;
(c) if the entry not found in one of the at least two queues, obtaining a new entry, and attempting to add the new entry to the hash table;
determining if a race condition is present when performing step (b) or step (c) due to the second thread;
when the race condition is present, repeating steps (a), (b) and (c); and
when the race condition is not present, returning a pointer to either the found entry or the new entry for use in the I/O operation.

15. The non-transitory computer readable medium of claim 14, wherein determining if the race condition is present comprises, if the entry is in one of the at least two queues and after obtaining the second lock, determining that the race condition is present by comparing the second key to the first key and discovering that the second key is not equal to the first key.

16. The non-transitory computer readable medium of claim 14, wherein determining if the race condition is present comprises, if the entry is in one of the at least two queues and after attempting to add the new entry to the hash table, determining that the race condition is present by discovering that the hash table has the new entry.

17. The non-transitory computer readable medium of claim 14, wherein the cache data structure further includes a ghost queue and at least two queues including a hot queue and a cold queue, the hot queue being a ring buffer that contains entries having a high frequency of use, the cold queue being a first-in, first-out buffer that contains entries having a frequency of use lower than entries of the hot queue, and the ghost queue being a first-in, first-out buffer that contains entries evicted from the cold queue.

18. The non-transitory computer readable medium of claim 17, wherein obtaining a new entry includes:
searching the hash table to determine whether the first key is in the ghost queue;
if the first key is in the ghost queue, allocating an entry from the hot queue; and
if the key is not in the ghost queue, allocating an entry from the cold queue.

19. The non-transitory computer readable medium of claim 18,
wherein the hot queue includes a clock hand that points to entries in the hot queue; and
wherein allocating an entry from the hot queue includes performing an atomic increment operation to obtain the clock hand to access the entries in the hot queue.

20. The non-transitory computer readable medium of claim 18,
wherein the cold queue includes an entry pointer that points to entries in the cold queue; and
wherein allocating an entry from the hot queue includes performing an atomic operation to obtain the entry pointer to access the entries in the cold queue.

* * * * *